United States Patent
Gidra et al.

(10) Patent No.: US 10,558,564 B2
(45) Date of Patent: Feb. 11, 2020

(54) POINTERS IN A MEMORY MANAGED SYSTEM

(71) Applicant: HEWLETT PACKARD ENTERPRISE DEVELOPMENT LP, Houston, TX (US)

(72) Inventors: Lokesh Gidra, Palo Alto, CA (US); Evan R. Kirshenbaum, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 155 days.

(21) Appl. No.: 15/719,297

(22) Filed: Sep. 28, 2017

(65) Prior Publication Data
US 2019/0095323 A1    Mar. 28, 2019

(51) Int. Cl.
G06F 12/00 (2006.01)
G06F 12/02 (2006.01)

(52) U.S. Cl.
CPC .. G06F 12/0253 (2013.01); *G06F 2212/1044* (2013.01)

(58) Field of Classification Search
None
See application file for complete search history.

(56) References Cited

U.S. PATENT DOCUMENTS 9,053,017 B2   6/2015  Hillberg et al.
9,495,115 B2   11/2016 Schreiber et al.
(Continued)

FOREIGN PATENT DOCUMENTS

WO   WO-2017095367 A1   6/2017
WO   WO-2017095372 A1   6/2017

OTHER PUBLICATIONS

U.S. Appl. No. 15/167,563, filed May 27, 2016, Kirshenbaum et al.
(Continued)

*Primary Examiner* — Daniel D Tsui
(74) *Attorney, Agent, or Firm* — Hewlett Packard Enterprise Patent Department

(57) ABSTRACT

Examples disclosed herein relate to pointers in a memory managed system. A garbage collection thread in a garbage collection system indicates via a first indication, that the garbage collection system has entered a marking phase, the garbage collection system managing a heap of memory. The garbage collection thread attempts to modify a conversion status variable, associated with a mutator thread belonging to a set of mutator threads associated with the garbage collection system, from a first conversion status value, indicating that the mutator thread is performing a weak pointer conversion operation, to a second conversion status value indicating that a handshake is required between the garbage collection thread and the mutator thread. The garbage collection thread determines that the conversion status variable does not contain the second conversion status value. The garbage collection thread determines that a set of pointers is empty. The garbage collection thread attempts to indicate, via a third indication, that the marking phase has ended, wherein indicating using the third indication comprises determining that no mutator thread belonging to the set of mutator threads has provided a second indication indicating that the indicating mutator thread intends to add a pointer to the set of pointers. The garbage collection thread determines that the marking phase has ended when the attempt is successful. The garbage collection thread indicates, via a fourth indication, that the garbage collection system is still in the marking phase when the attempt is successful.

20 Claims, 8 Drawing Sheets

(56) References Cited

U.S. PATENT DOCUMENTS

| | | |
|---|---|---|
| 2002/0120823 A1 | 8/2002 | Kolodner et al. |
| 2005/0198088 A1 | 9/2005 | Subramoney et al. |
| 2006/0155791 A1 | 7/2006 | Tene et al. |
| 2010/0114998 A1 | 5/2010 | Steensgaard et al. |
| 2015/0261670 A1 | 9/2015 | Cheriton et al. |
| 2017/0168933 A1 | 6/2017 | Kawachiya et al. |

OTHER PUBLICATIONS

David Plainfosse et al, Experience with a Fault-tolerant Garbage Collector in a Distributed Lisp System, (Research Paper), Retrieved Jul. 28, 2017, 18 Pgs.
Tamar Domani et al, Implementing an On-the-fly Garbage Collector for Java, (Research Paper), Retrieved Jul. 28, 2017, 12 Pgs.
Ugawa, T. et al. "Reference Object Processing in On-The-Fly Garbage Cotection," ACM, 2014, https://www.researchgate.net/profile/Richard_Jones17/publication/266659120_Reference_Object_Processing_in_On-The-Fly_Garbage_Collection/links/561fd6b008aea35f267e0fdb.pdf.
European Search Report and Search Opinion Received for EP Application No. 18197283.7, dated Mar. 1, 2019, 9 pages.

POINTERS IN A MEMORY MANAGED SYSTEM

BACKGROUND

Garbage collection is a type of memory management where a garbage collector reclaims memory occupied by objects that are no longer in use. Garbage collection may be used and/or required by certain programming languages. In a system that employs garbage collection, some objects may be allocated on a heap managed by a garbage collector. The heap may be a portion of memory where allocated objects (e.g., records, structures, instances, or data values) reside. When an object is allocated, an unused range of memory addresses (or otherwise characterized memory or storage region) is identified on the heap, and that region of memory is used to create the object and contain its data.

The job of the garbage collector is to distinguish between allocated objects that are reachable and those that are unreachable, where an object is considered to be reachable when it is possible for any current or future executing program code to access the object or its data. An object is considered unreachable when it is not possible for any executing program code to access the object or its data. When objects are determined to be unreachable, the garbage collector may declare the memory regions they occupy to be unallocated and return this memory to the allocator for use in allocating new objects. This process is known as collecting (or garbage collecting) the objects.

Garbage collection may involve determining a set of root pointers. A root pointer is a pointer to an object stored in a garbage-collected heap where the root pointer itself is observed by a garbage collector in a location other than on the garbage-collected heap. For example, the pointer may be observed in a processor register, on a program or thread stack, in a global or thread-local variable or structure, or within a heap other than the garbage-collected heap.

Garbage collection may include determining objects that are reachable starting from the root pointers. An object may be considered reachable if it is pointed to by a root pointer or by a pointer contained in some reachable object. Pointers may be considered to be strong pointers or weak pointers. An object referred to by a strong pointer that is a root or is contained in a reachable object is considered reachable. A weak pointer, by contrast, does not affect the reachability of the object it points to. When an object has no strong pointers to it from reachable objects, it will be garbage collected in a subsequent GC cycle even if it is referred to by weak pointers.

BRIEF DESCRIPTION OF THE DRAWINGS

The following detailed description references the drawings, wherein.

DETAILED DESCRIPTION

Figure 1:
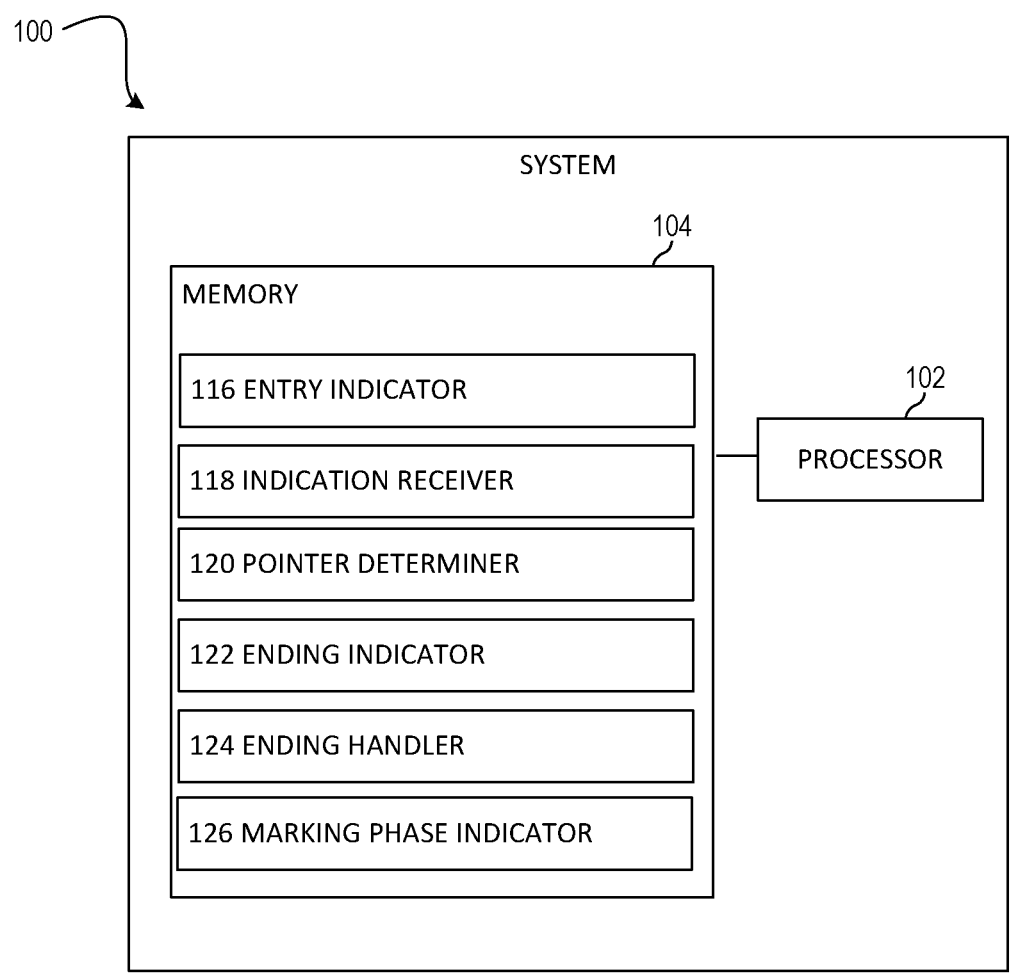
FIG. 1 is a block diagram of an example system in which using pointers in a memory managed system may be useful.

A method for pointers in a memory managed system may include indicating, by a garbage collection thread participating in a garbage collection system, via a first indication, that the garbage collection system has entered a marking phase, the garbage collection system managing a heap of memory. The method may include attempting, by the garbage collection thread, to modify a conversion status variable, associated with a mutator thread belonging to a set of mutator threads associated with the garbage collection system, from a first conversion status value, indicating that the mutator thread is performing a weak pointer conversion operation, to a second conversion status value indicating that a handshake is required between the garbage collection thread and the mutator thread. The method may include determining, by the garbage collection thread, that the conversion status variable does not contain the second conversion status value and determining, by the garbage collection thread, that a set of pointers is empty. The method may include attempting, by the garbage collection thread, to indicate, via a third indication, that the marking phase has ended, wherein indicating using the third indication comprises determining that no mutator thread belonging to the set of mutator threads has provided a second indication indicating that the indicating mutator thread intends to add a pointer to the set of pointers. The method may include determining, by the garbage collection thread, that the marking phase has ended when the attempt is successful and indicating, by the garbage collection thread, via a fourth indication, that the garbage collection system is still in the marking phase when the attempt is successful.

As generally described herein, a weak pointer, unlike a strong pointer, to an object does not ensure that the object will remain uncollected long enough to access or modify its content. To enable safe use of a weak pointer, a weak pointer conversion operation (also known as a get or lock or fetch operation on the weak pointer) must be performed. This operation returns a strong pointer, which will be a null pointer (a pointer not referring to any object) if the garbage collector has determined that the weak pointer refers to an unreachable object and a strong pointer to the object referred to by the weak pointer otherwise. This strong pointer, if non-null, may be used to access and modify the content of the object, which is guaranteed to remain uncollected at least for the life of the strong pointer. Once it has been determined that the object referred to by a weak pointer is unreachable, all subsequent invocations of the weak pointer conversion operation will return a null strong pointer. The functionality of the weak pointer conversion operation may be in the form of an Application Programming Interface (API) such as the get( ) method of the Java WeakReference class, the lock( ) member function of the standard C++ weak_ptr<T> class, etc. For ease of explanation, the term get function will be used, but it is to be understood that a variety of different implementations of that functionality may be used.

FIG. 1 is a block diagram of an example system 100 for using pointers in a memory managed system. System 100 may include a processor 102 and a memory 104 that may be coupled to each other through communication link (e.g., a bus). Processor 102 may include a Central Processing Unit (CPU), a Graphics Processing Unit (GPU), or another suitable processor. In some examples, memory 104 stores machine readable instructions executed by processor 102 for operating system 100 as well as data used by programs executed by processor 102. Memory 104 may include any suitable combination of volatile and/or non-volatile memory, such as combinations of Random Access Memory (RAM), Read-Only Memory (ROM), memristor memory, spin-transfer torque memory, flash memory, and/or other suitable memory. Memory 104 may also include storage on non-volatile storage devices such as disks or solid-state devices (SSD). Processor 102 may include multiple cores. Processor 102 may also comprise multiple processors.

Memory 104 stores instructions to be executed by processor 102 including instructions for an entry indicator 116, an indication receiver 118, a pointer determiner 120, a ending indicator 122, an ending handler 124, a marking phase indicator 126 and/or other components. According to various implementations, system 100 for using pointers in a memory managed system may be implemented in hardware and/or a combination of hardware and programming that configures hardware. Furthermore, in FIG. 1 and other Figures described herein, different numbers of components or entities than depicted may be used.

System 100 may utilize a garbage collection (GC) system, such as an on-the-fly garbage collection system. The garbage collection system may comprise one or more garbage collection threads managing a GC-managed memory heap and one or more mutator threads (non-garbage-collection threads, also known as application threads) using objects stored in the GC-managed memory heap. Each thread may be associated with one of a set of one or more operating system processes, and the mutator threads may be associated with one or more of the GC threads associated with the mutator threads' associated operating system process. While the current description may speak as though there is a single GC thread (e.g., "the GC thread") and a single operating system process, it should be understood the GC system may comprise multiple operating system processes and that each operating system process may be associated with one or more GC threads. In addition, some operating system processes may be associated with no mutator threads. The GC system may support both strong pointers and weak pointers, and it may be possible to distinguish strong pointers from weak pointers by observing information associated with them. For example, both strong and weak pointers may be represented as 64-bit numbers, and a particular bit (e.g., bit 63) in a strong pointer may have a zero value while the corresponding bit in a weak pointer may have a one value.

Garbage collection may comprise several activities that are performed sequentially or in parallel. When processed sequentially, these activities may be called "phases". For example, a garbage collector may perform a marking phase (also known as a "tracing phase"), in which the reachability of objects on the heap are identified. An example marking phase where different colors are used for different reachability statuses is discussed in further detail below. A garbage collector may also perform a "sweeping phase", in which regions of memory determined to not contain reachable objects (during the marking phase) are made available for the satisfaction of subsequent requests to allocate objects. Garbage collection activities may be performed in a cyclic manner, where the performance of the activities in one garbage collection cycle is followed by the performance of the activities in the next cycle. For example, if a garbage collection cycle comprises a marking phase followed by a sweeping phase, then the sweeping phase of cycle 1 may be followed by the marking phase of cycle 2.

On-the-fly garbage collection may be performed without halting any running application threads in the system for significant periods of time. The garbage collection system may be used in determining whether a pointer refers to a reachable object. As used herein, a reachable object is an object in a GC-managed memory heap that is potentially accessible by a program. During a marking (or tracing) phase of garbage collection, all reachable objects are enumerated and marked. All objects in the GC-managed heap may be associated with one of three colors: white, gray, or black. At the beginning of a marking phase, all objects may be white objects. Objects referred to by root pointers may have their color changed to gray by adding pointers to them to the garbage collector's work queue, which may be a data structure such as a queue, stack, set, or list. The garbage collector may remove a pointer from the work queue, identify the object pointed to by the pointer, enumerate the pointers contained within the object, and then change the color of the object to black by associating the object with an indication such as a bit corresponding to the object's memory address in a bitmap (the mark bitmap) having a particular value. Enumerating the pointers contained in the object may comprise causing the objects they refer to be colored gray (as above) if they are not already identified as being black. When the garbage collector is an on-the-fly garbage collector, in order to prevent long pauses in mutator threads using the GC-managed heap, when a memory location containing a strong pointer is overwritten by (or assigned) a new strong pointer value, either the old or new content of the memory location may, depending on the status of the garbage collector, also be marked as gray, To avoid contention on the garbage collector's work queue, the mutator thread may mark objects as gray by adding pointers to them to a set of gray pointers known as the mutator thread's mark buffer, which can be added to only by the mutator thread and removed from only by the garbage collector. These mark buffers may be logically considered to be part of the garbage collector's work queue. By this recursive procedure, when the garbage collector's work queue (including all mutator threads' mark buffers) is empty, all reachable objects have been colored black, and unreachable objects remain as white. The unreachable objects may then be collected in a subsequent sweeping phase of the garbage collection.

In an on-the-fly weak pointer processing mechanism, if the get function is called by a mutator thread while marking, system 100 may employ a mechanism such that if the referred object is not already marked, then it is to be put in the mutator thread's mark buffer, so that the GC thread will mark the referenced object during the current marking cycle. When this operation is successfully completed, a strong pointer to the object can be returned to the application thread. If the object is already marked, then the strong pointer can be returned immediately.

In the absence of weak pointers, the termination of the marking process may be determined by observing that the work queue is empty and having observed, individually, that each mutator thread's mark buffer was empty. In a single-process garbage collector, this determination will be correct even if, at the time it is made, some of the mark buffers are no longer empty, since the definition of reachability guarantees that the set of reachable objects at the end of the marking phase is the same as the set of reachable objects at the beginning of the marking phase plus any objects allocated during the marking phase, which are therefore marked as black upon allocation. This means that any pointers remaining in the mark buffers would, if checked, be determined to point to already marked black objects. In a multi-process garbage collector a consensus must be reached among all garbage collection threads that they all understand this to be the case of all of them. This may be accomplished by means of a two-phase barrier in which in the first phase, all garbage collector threads having observed their own gray sets (work queue and mark buffers) to be empty, all GC threads may wait at a first phase barrier until all threads have reached the first phase barrier. When all GC threads have passed this first phase barrier, each GC thread may again check to ensure that all of its associated mark buffers are still empty. If any GC thread discovers a non-empty mark buffer, all may go back to process their mark buffers and wait at the first phase barrier. If a GC thread's mark buffers are still empty, it may wait at the second phase barrier. When all garbage collection threads reach the second phase of the barrier (without any having discovered a non-empty mark buffer), the marking phase may be deemed to be completed, even though some mark buffers may no longer be empty, having received values after being observed to be empty.

With the addition of weak pointers, the get operation may cause an object which was not reachable at the beginning of the marking phase (that is, one pointed to by weak pointers but not by any strong pointer) to become reachable by creating a strong pointer to it. This renders the marking termination determination described above insufficient, as some of the entries remaining in the mark buffers may have been added after those mark buffers were determined to have been empty.

System 100 may contain a status variable shared among all garbage collection threads and mutator threads. The status variable may be an atomically-modifiable variable, such as the atomic<T> class supported by the C++ programming language. Such an atomically-modifiable (or atomic) variable may support a compare-and-swap (CAS) operation such as atomic<T>'s compare_exchange_strong member function, which atomically sets the variable to a provided desired value if and only if the variable's current value at the time of the modification is a provided expected value. If the value is not the expected value, no modification takes place and the operation returns an indication of the variable's current value. The status variable may be able to take a variety of values such as NORMAL, TRACE, REPEAT, CLEAN, etc. Of course, these values are used for illustration purposes and other values may be used. When the garbage collector is not in the marking phase or the sweep phase is not going on, the value of the status variable may be NORMAL. When the value of the status variable is NORMAL, the get function called on a weak pointer may return a strong pointer referring to the object referred to be the weak pointer.

Entry indicator 116 may indicate, via a first indication, that a garbage collection system comprising a plurality of garbage collection threads has entered a marking phase, the garbage collection system managing a heap of memory. This indication may include setting the status variable to a first value (e.g., TRACE) indicating that the garbage collection thread is processing the set of gray pointers (the work queue and/or mark buffers).

In some aspects, a mutator thread handler may perform actions associated with the mutator thread. For example, a mutator thread in a set of mutator threads associated with the garbage collection thread, may determine that the garbage collection system in the marking phase based on observing the first indication (e.g., the shared status variable having a value of TRACE) during a weak pointer conversion operation (e.g., a get operation). The mutator thread handler may further indicate, by the mutator thread via a second indication, that the mutator thread intends to add a pointer to a set of pointers such as the mark buffer associated with the mutator thread. The second indication may be an atomic change (e.g., by a CAS operation) of the shared status variable from the first value (e.g., TRACE) to a second value (e.g., REPEAT). Upon successfully indicating the second indication, the mutator thread may add the pointer (e.g., a strong pointer with the same referent as the get operation's weak pointer argument) to the set of pointers. The indication may be unsuccessful if the value of the status variable is not TRACE at the time the indication was attempted. Upon failing to indicate, the mutator thread may continue in the get operation by acting on the current value of the status variable.

Indication receiver 118 may receive, by the garbage collection thread, a second indication from a mutator thread belonging to a set of mutator threads associated with the garbage collection, the second indication from the mutator thread indicating that the mutator thread intends to add a pointer to a set of pointers.

Pointer determiner 120 may determine, by the garbage collection thread, that the set of pointers is empty. Ending indicator 122 may attempt, by the garbage collection thread to indicate, via a third indication, that the marking phase has ended, wherein indicating using the third indication comprises determining that no mutator thread belonging to the set of mutator threads has provided the second indication and that no garbage collection thread belonging to the plurality of garbage collection threads has provided the fourth indication. Indicating via the third indication may involve atomically changing the status variable (e.g., by a CAS operation) from the first value (e.g., TRACE) to a third value (e.g., CLEAN) indicating that the garbage collection thread is finished processing the set of pointers. If the second indication, as described above, involves changing the status variable to a second value (e.g., REPEAT) distinct from the TRACE, the attempt to provide the third indication will fail if a mutator thread has provided the second indication. Successfully providing the third indication therefore entails the required determination. Ending handler 124 may determine, by the garbage collection thread, that the marking phase has ended when the attempt is successful.

After ascertaining that the gray set (e.g., the work queue and mark buffers) is empty, the GC thread may attempt to provide the third indication by atomically attempting to change the status variable from TRACE to CLEAN. If it succeeds, the GC thread can declare the marking phase finished. If in the meantime, some application thread has changed the status variable to REPEAT, this indicates to the GC thread that there may be some gray objects that it might have missed. Accordingly, the GC thread may have to go through the gray set again and finish marking work on any objects found.

Marking phase indicator 126 may indicate, by the garbage collection thread, via a fourth indication, that the garbage collection system is still in the marking phase. For example, before beginning to go through the gray set again, the GC thread may atomically change the status variable from REPEAT to TRACE.

The behavior of the mutator thread within the get operation may depend on an observed value of the status variable. When the observed value is TRACE, the mutator thread may indicate using the second indication (e.g., changing the status variable from TRACE to REPEAT) and then inserting a pointer into its mark buffer and returning a non-null strong pointer. When the observed value is NORMAL, the mutator thread may return a non-null strong pointer without adding a pointer to its mark buffer. When the observed value is REPEAT, the mutator thread may return a non-null strong pointer after adding a pointer to its mark buffer. When the observed value is CLEAN, the mutator thread may return a null or non-null strong pointer based on whether the referenced object was determined to be reachable and may refrain from adding a pointer to its mark buffer.

After providing the fourth indication (e.g., changing the status variable from REPEAT to TRACE), the GC thread may check whether its mutator threads' mark buffers are empty to determine that the marking phase has ended. If any mutator thread is in a get operation and observes that the status variable has a value of REPEAT prior to the provision of the fourth indication but has not yet added the pointer to its mark buffer before the GC thread checks it, the GC thread may incorrectly determine that it is allowed to declare the marking phase completed. To remove this risk, the GC thread may perform a handshake with mutator threads following provision of the fourth indication and before checking for empty mark buffers. A handshake is an operation involving two parties initiated by one (e.g., the GC thread) and requiring an acknowledgement by the other (e.g., a mutator thread) before one or both are allowed to proceed. The acknowledgement may be implicit (e.g., by a variable already having a value that an active acknowledgement would set it to). A mutator thread in the get operation may ensure that it delays acknowledging the handshake until it has finished adding pointers to its mark buffer, thereby ensuring that the GC thread will correctly see a non-empty mark buffer.

A handshake between threads may be performed by one thread sending an operating system signal to another and the receiving thread, in response to the signal (e.g., in or after handling the signal) modifying a variable visible to the sending thread. Sending and receiving such signals may be a relatively computationally expensive operation and as the handshake must be performed with each mutator thread, this may be infeasible if the second indication is provided frequently. To reduce the cost, an alternative handshake mechanism may be employed.

In the alternative handshake, each mutator thread is associated with a conversion status variable, shared with the GC thread. The conversion status variable may be initialized to have a first value (e.g., WORKING) that indicates that the mutator thread is not performing the weak pointer conversion (e.g., get) operation. Within the get operation and before determining the value of the shared status variable, the mutator thread may set its conversion status variable to a second value (e.g., CONVERTING) indicating that the mutator thread is performing the weak pointer conversion operation. Prior to exiting the weak pointer conversion operation, the mutator thread may set its conversion status variable back to the first value (WORKING).

To perform the handshake, the GC thread may enumerate its mutator threads and for each, the GC thread may attempt to atomically change (e.g., by a CAS operation) the mutator thread's conversion status variable from the second value (e.g., CONVERTING) to a third value (e.g., ACKNOWLEDGE) indicating that acknowledgement is required. Acknowledgement at this handshake may involve the GC thread observing the value to be anything other than the third value. As the GC thread, during the handshake, is the sole entity that can change the conversion status variable's value to the third value and as just these three values may be allowed, failure to atomically change the conversion status variable from the second value to the third value may be considered to be an implicit acknowledgement. Therefore the handshake may involve the GC thread waiting until at least those threads for which the GC thread changed the conversion status variable from the second value to the third value to have a value other than the third value. Either other value is sufficient because either implies that the mutator thread has completed the get operation it was in when the handshake affected it and that all subsequent get operations will observe and will have observed the shared status variable to have a value of REPEAT.

In a multi-process garbage collector employing a two-phase barrier, this handshake may be further improved by splitting it in two parts. In this optimized version, the GC thread may attempt to change the values of the conversion status variables following its changing the shared status variable to REPEAT, as described above, but it may delay waiting for all conversion status variables to have a value other than ACKNOWLEDGE until the second phase of the two-phase barrier, prior to checking whether its mutator threads' mark buffers are empty.

Since the GC thread may need to do significant extra work when it observes that a mutator thread has changed the shared status variable from TRACE to REPEAT, it may be advantageous to reduce the situations in which it is necessary for the mutator threads to do so. To enable this, each GC thread (or each of the GC threads associated with an operating system process) may be associated with a thread count indicating a number of mutator threads adding pointers to their respective mark buffers and a repeat required flag, which may indicate whether incrementing the thread count is disallowed. The thread count and the repeat required flag may be implemented in such a way that both the thread count and the repeat required flag may be observed and modified atomically (i.e., both values observed at the same time and both values modified at the same time). This may be accomplished by treating the low-order bit of an integral variable as the repeat required flag and the remaining high-order bits as the thread count. In such an implementation, atomically incrementing the thread count while preserving the repeat required flag may be performed by atomically adding 2 to the integral variable and atomically decrementing the thread count while preserving the repeat required flag may be performed by atomically subtracting two from the integral variable. Initially, the value of the thread count may be zero and the value of the repeat required flag may be false.

When a mutator thread performing the weak pointer conversion operation observes that the shared status variable has a value of TRACE, the mutator thread may attempt to atomically increment the thread count, but in doing so, the mutator thread may check the value of the repeat required flag and may refuse to increment the thread count when the repeat required flag is true. This may be done by using a CAS operation in a loop, terminating when the CAS operation succeeds or the repeat required flag is observed to have a true value. If the attempt succeeds, the mutator thread may add a pointer to its mark buffer without changing the shared status variable to REPEAT and then decrement the thread count. If the attempt fails, the repeat required flag must have been observed to be true, and so the mutator thread may change the shared status variable to REPEAT.

Before a mutator thread begins the marking phase, it may change the repeat required flag to false and the thread count value simultaneously to zero. When a GC thread in the two-phase barrier is about to check its mutator threads' mark buffers after passing the first phase barrier, it may attempt to atomically change the repeat required flag from false to true, but this attempt may be constrained to only succeed when the thread count value is zero. If this attempt succeeds, it may be inferred that no associated mutator thread is about to add a pointer to its mark buffer and that should one attempt to do so, it will first attempt to change the shared status variable from TRACE to REPEAT. If the attempt fails, it may be inferred that an associated mutator thread is about to add a pointer to its mark buffer, and the GC thread may proceed as though it had observed a non-empty mark buffer. If a GC thread observes a non-empty mark buffer or if a GC thread succeeds in changing the shared status variable from REPEAT to TRACE, either of which may imply that all GC threads must go back and process their associated mark buffers, each GC thread may change the repeat required flag to false and the thread count value simultaneously to zero.

In a multi-process GC system with multiple GC threads, it may be possible for a first GC thread to fail to provide the third indication upon observing that the shared status variable has a value of REPEAT and to provide the fourth indication by changing the shared status variable from REPEAT to TRACE and for a second GC thread to then succeed in providing the third indication by changing the status variable from TRACE (provided by the first GC thread) to CLEAN, breaking the invariant that providing the third indication comprises determining that no mutator thread provided the second indication.

To remove this problem, the shared status variable may take as values the previously described values (e.g., NORMAL, TRACE, REPEAT, and CLEAN) atomically paired with a redo requested flag, such that both the value and the flag are observed and modified together. The redo requested flag may only be considered when the value of the status variable is TRACE, so for simplicity, this description will speak of the values TRACE-0 and TRACE-1 for the situation in which the value is TRACE and the redo requested flag is unset and set respectively. TRACE-? will be used for the situation in which the value is TRACE and the value of the redo requested flag is unimportant.

Providing the first indication may comprise a GC thread setting the status variable to value TRACE-1. After passing through the first phase barrier of the two-phase barrier, each GC thread may attempt to atomically change the status variable (e.g., by a CAS operation) from TRACE-1 to TRACE-0. Failure of this attempt is unimportant. Providing the second indication may comprise a mutator thread atomically changing the status variable from TRACE-? to REPEAT. Providing the third indication may involve atomically changing the status variable from TRACE-0 to CLEAN. Providing the fourth indication may involve atomically changing the status variable from REPEAT to TRACE-1. In the scenario described above, the first GC thread would change the status variable from REPEAT to TRACE-1, which would make it impossible for the second GC thread to change the status variable from TRACE-0 to CLEAN.

The GC system may require that upon the termination of each sweep phase of the GC cycle, all weak pointers within reachable objects or as root pointers either contain null values or pointers to reachable objects. To enforce this invariant, during the sweep phase, weak pointers that contain pointers to unreachable objects may have their contents replaced by null values. This process has several cases.

When weak pointers on the GC-managed heap are enumerated during the marking phase as a consequence of their enclosing objects being marked as black objects, if the weak pointer does not contain a null value or a pointer to an object that has been noted as a reachable object (e.g., by having been marked in the mark bitmap), the address of the weak pointer may be noted, as by being marked in a shared weak pointer bitmap. During the sweep phase, the noted weak pointer addresses may be enumerated using the weak pointer bitmap. For each such weak pointer whose value, at the time of the enumeration is non-null and not a reference to a reachable object, an attempt may be made to replace the observed value (which may be different from the value observed during marking) with a null pointer. If this attempt fails, it may be inferred that the observed value was replaced by a null value or a reference to a reachable object.

During the sweep phase, the GC thread may cause its associated mutator threads to enumerate the contents of their respective execution stacks and registers at a point at which execution on the enumerating mutator thread is otherwise paused. This may occur as part of the handshake used to transition into the sweep phase. If the mutator thread can unambiguously determine that a memory location contains a weak pointer, then if that weak pointer refers to an unreachable object, the weak pointer's contents may be replaced by a null value. It may, however, be impossible for a mutator thread to be certain that a given memory location on the stack contains a weak pointer. In such situations, it may cause corruption of the application to blindly write a null pointer value replacing a value merely suspected of being a weak pointer. In such circumstances, rather than modifying the value, the mutator thread may add the putative weak pointer's address to a cleared root weak pointer set associated with the mutator thread. When determining whether a weak pointer points to a reachable object, the mutator thread may attempt to find the weak pointer's address in the cleared root weak pointer set. If it finds the address in the set, it may determine that the weak pointer points to an unreachable object, replace the content of the weak pointer with a null pointer value, and remove the address from the cleared root weak pointer set. If a putative weak pointer is not a weak pointer, adding its address to the cleared root weak pointer set will not cause problems as the get operation will not be called on a weak pointer with that address. In some embodiments, potential root pointer locations other than mutator thread stacks may be enumerated during the sweep phase and their addresses similarly added to the cleared root weak pointer set.

To ensure that the cleared root weak pointer set does not contain addresses corresponding to weak pointers that point to reachable objects, the mutator threads may ensure that whenever a weak pointer is created or cleared, the address of the resulting weak pointer (e.g., the created weak pointer or the target of the assignment) is removed from the cleared root weak pointer set if it was a member of that set.

When the shared status variable does not have the CLEAN value, a mutator thread may consider any weak pointer to point to a reachable object. When the shared status variable has the CLEAN value, a mutator thread may consider a weak pointer's referenced object to be reachable if it was marked in the preceding marking phase (e.g., its address is marked in the mark bitmap) or if it was allocated during the current sweep phase and may consider the referenced object to be unreachable otherwise. To facilitate this process, weak pointers may contain (or otherwise be associated with) a sweep assigned indication (e.g., as an identified bit in the weak pointer representation), which may indicate that the weak pointer was assigned a pointer to an unmarked reachable object during a sweep phase. This indication may have a true value when a non-weak pointer to an unmarked object has been copied to a weak pointer (e.g., during weak pointer creation or assignment) while the status variable has the CLEAN value or when a weak pointer bearing that indication is similarly copied to a weak pointer while the status variable has the CLEAN value. The indication may have a false value otherwise. During the marking phase, when a weak pointer containing the sweep assigned indication is enumerated in the process of marking an enclosing object as black, the sweep assigned indication may be removed. This removal may be performed atomically (e.g., by a CAS operation) to ensure that a simultaneous write operation to the weak pointer by another thread is not overwritten. In an alternative embodiment, objects allocated during the sweep phase may be associated with an indication (e.g., within an object descriptor associated with the object) that they were allocated during the most recent sweep phase. When an object associated with this indication is marked as black during the subsequent marking phase, the indication may be removed. When the get operation is performed while the shared status variable has the CLEAN value, a weak pointer to an object bearing this indication may be considered to be a live object.

To aid in bookkeeping, the weak pointer creation and assignment operations may perform their copying within a write barrier operation. The write barrier operation may ensure that the address of the target weak pointer of the copy (e.g., the weak pointer being created or assigned to) is removed from the cleared root weak pointer set. It may ensure that if a source weak pointer of the copy (e.g., a weak pointer providing the value for the creation or the assignment) refers to an unreachable object, a null pointer value is copied instead of the source weak pointer value, and may ensure that if a pointer to an unreachable object is discovered, it is replaced in the source weak pointer by a null pointer. This replacement may be performed using a CAS operation to ensure that if the source weak pointer has changed value (e.g., due to another mutator thread) after the unreachability was determined, the new source weak pointer value is not replaced. The write barrier may further ensure that the resulting weak pointer only bears the sweep assigned indication as described above. The write barrier may ensure that when the status variable has the value TRACE or REPEAT and a source weak pointer points to an unmarked object, the address of the target weak pointer may be marked in the weak pointer bitmap to ensure that the address will be enumerated during the sweep phase and the weak pointer cleared if it does not at that point contain a pointer to a marked object.

Figure 2:
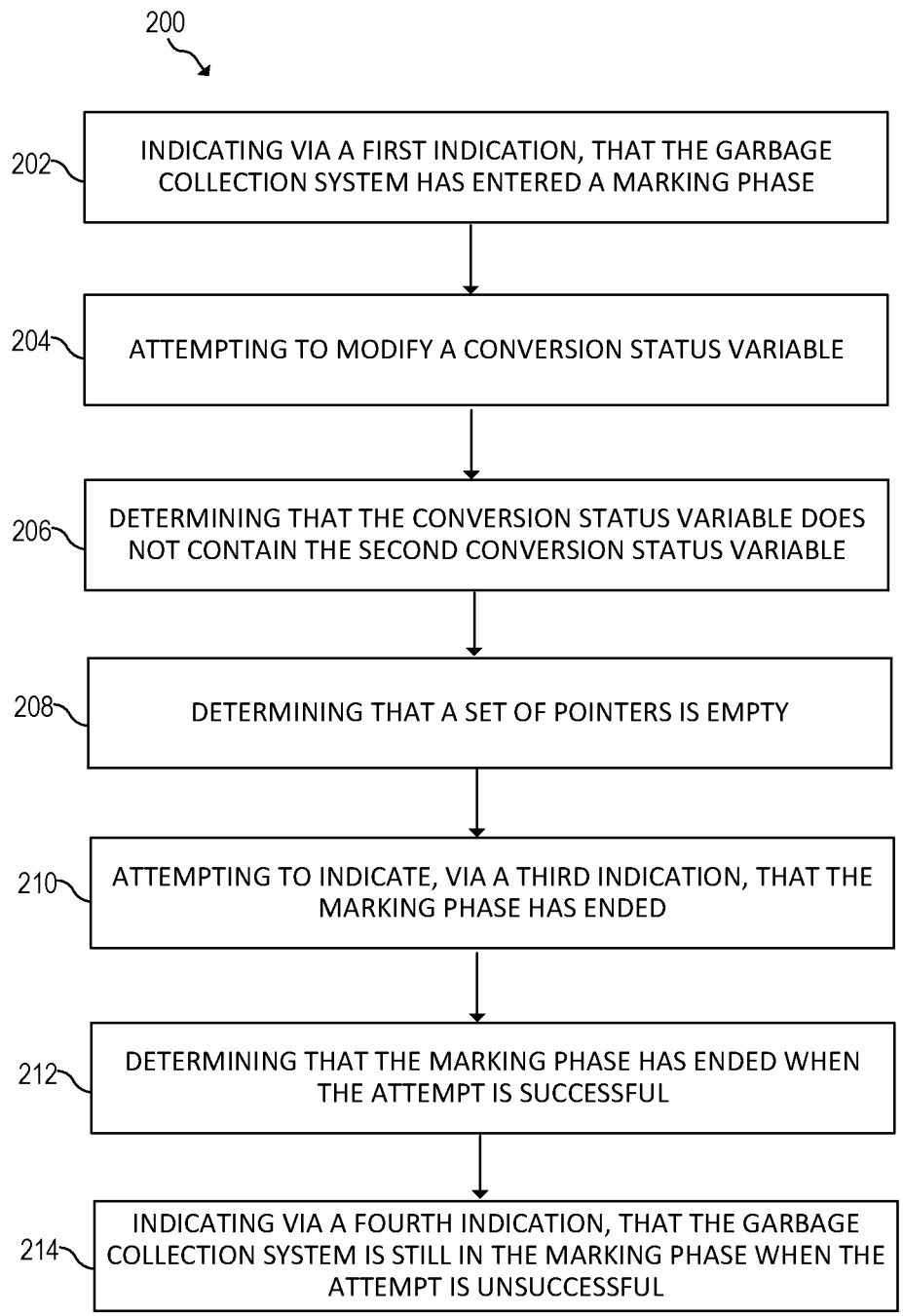
FIG. 2 is a flowchart of an example method for using pointers in a memory managed system.

Turning now to FIG. 2, a flowchart of an example method 200 for using pointers in a memory managed system is presented. Method 200 may be described below as being executed or performed by a system, for example, system 100 of FIG. 1 or system 800 of FIG. 8. Other suitable systems and/or computing devices may be used as well. Method 200 may be implemented in the form of executable instructions stored on at least one machine-readable storage medium of the system and executed by at least one processor of the system. Alternatively or in addition, method 200 may be implemented in the form of electronic circuitry (e.g., hardware). In alternate examples of the present disclosure, at least one step of method 200 may be executed substantially concurrently or in a different order than shown in FIG. 2. In alternate examples of the present disclosure, method 200 may include more or fewer steps than are shown in FIG. 2. In some examples, at least one of the steps of method 200 may, at certain times, be ongoing and/or may repeat.

At block 202, the method may include indicating, by a garbage collection thread participating in a garbage collection system, via a first indication, that the garbage collection system has entered a marking phase, the garbage collection system managing a heap of memory. Indicating via the first indication may comprise setting a status variable shared between the garbage collection thread and the mutator thread to a first value indicating that the garbage collection thread is processing the set of pointers. At block 204, the method may include attempting, by the garbage collection thread, to modify a conversion status variable, associated with a mutator thread belonging to a set of mutator threads associated with the garbage collection system, from a first conversion status value, indicating that the mutator thread is performing a weak pointer conversion operation, to a second conversion status value indicating that a handshake is required between the garbage collection thread and the mutator thread. Attempting to modify the conversion status variable may occur prior to a first phase barrier in a two-phase marking barrier.

Figure 3:
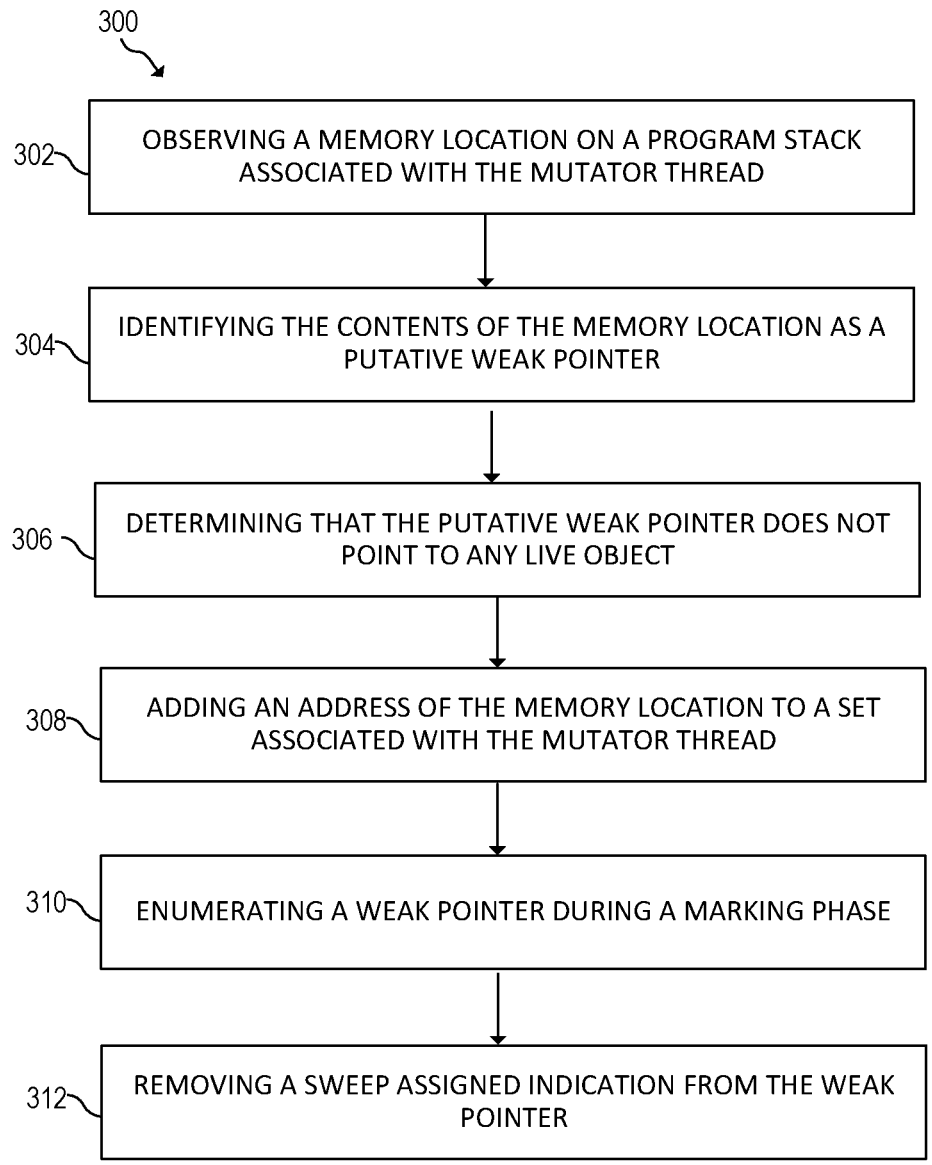
FIG. 3 is a flowchart of an example method for enumerating a weak pointer.

At block 206, the method may include determining, by the garbage collection thread, that the conversion status variable does not contain the second conversion status value. Determining that the conversion status variable does not contain the second conversion status value may take place after the first phase barrier in the two-phase marking barrier. At block 208, the method may include determining, by the garbage collection thread, that a set of pointers is empty. At block 210 the method may include attempting, by the garbage collection thread, to indicate, via a third indication, that the marking phase has ended, wherein indicating using the third indication comprises determining that no mutator thread belonging to the set of mutator threads has provided a second indication indicating that the indicating mutator thread intends to add a pointer to the set of pointers. Indicating via the second indication may comprise atomically changing the status variable from the first value to a second value indicating that values are being added to the set of pointers. Indicating via the third indication may comprise atomically changing the status variable from the first value to a third value indicating that the garbage collection thread is finished processing the set of pointers. At block 212 the method may include determining, by the garbage collection thread, that the marking phase has ended when the attempt is successful. At block 214, the method may include indicating, by the garbage collection thread, via a fourth indication, that the garbage collection system is still in the marking phase when the attempt is unsuccessful. Indicating via the fourth indication may comprise atomically changing the status variable from the second value to the first value. Indicating via the fourth indication may comprise setting a redo requested flag visible to garbage collection threads participating in the garbage collection system to a value indicating that the fourth indication has been indicated Turning now to FIG. 3, a flowchart of an example method 300 for enumerating a weak pointer is described. Method 300 may be described below as being executed or performed by a system, for example, system 100 of FIG. 1 or system 800 of FIG. 8. Other suitable systems and/or computing devices may be used as well. Method 300 may be implemented in the form of executable instructions stored on at least one machine-readable storage medium of the system and executed by at least one processor of the system. Alternatively or in addition, method 300 may be implemented in the form of electronic circuitry (e.g., hardware). In alternate examples of the present disclosure, at least one step of method 300 may be executed substantially concurrently or in a different order than shown in FIG. 3. In alternate examples of the present disclosure, method 300 may include more or fewer steps than are shown in FIG. 3. In some examples, at least one of the steps of method 300 may, at certain times, be ongoing and/or may repeat.

At block 302, the method 300 may include observing a memory location on a program stack associated with the mutator thread. At block 304, the method may include identifying the contents of the memory location as a putative weak pointer and at block 306, the method may include determining that the putative weak pointer does not point to any live object. At block 308, the method may include adding an address of the memory location to a set associated with the mutator thread. At block 310, the method may include enumerating a weak pointer during a marking phase and at block 312, the method may include removing a sweep assigned indication from the weak pointer. In some aspects, the method may include removing a sweep allocated indication from an object pointed to by the weak pointer.

Figure 4:
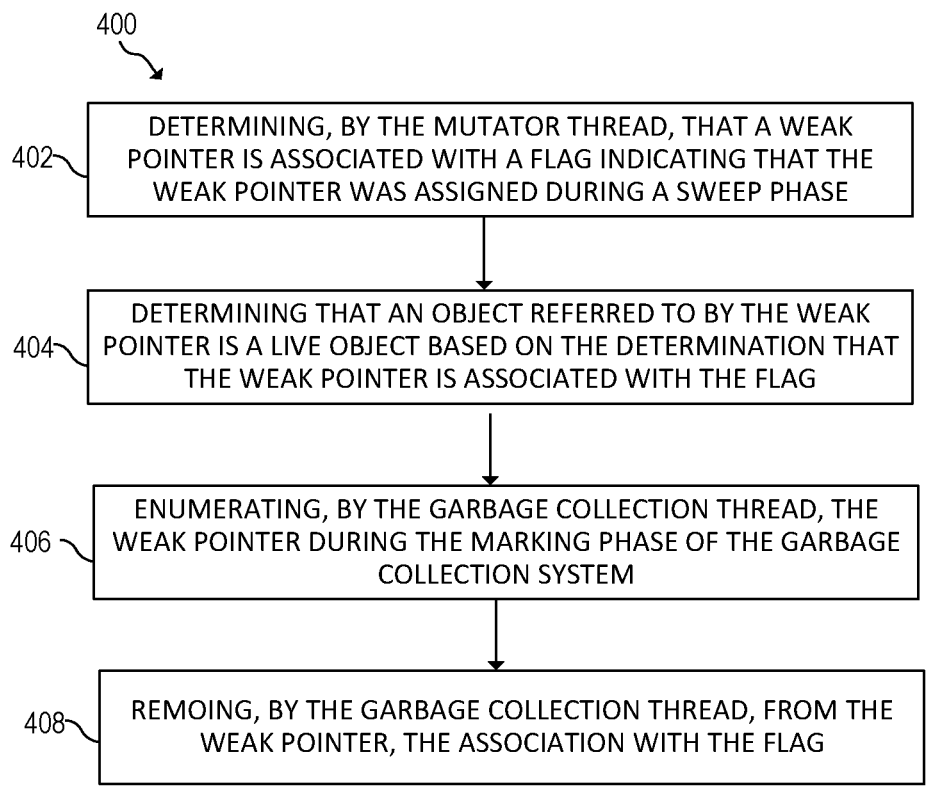
FIG. 4 is a flowchart of an example method for indicating that a weak pointer was assigned during a sweep phase.

Turning now to FIG. 4, a flowchart of an example method 400 for indicating that a weak pointer was assigned during a sweep phase is described. Method 400 may be described below as being executed or performed by a system, for example, system 100 of FIG. 1 or system 800 of FIG.8. Other suitable systems and/or computing devices may be used as well. Method 400 may be implemented in the form of executable instructions stored on at least one machine-readable storage medium of the system and executed by at least one processor of the system. Alternatively or in addition, method 400 may be implemented in the form of electronic circuitry (e.g., hardware). In alternate examples of the present disclosure, at least one step of method 400 may be executed substantially concurrently or in a different order than shown in FIG. 4. In alternate examples of the present disclosure, method 400 may include more or fewer steps than are shown in FIG. 4. In some examples, at least one of the steps of method 400 may, at certain times, be ongoing and/or may repeat.

At block 402, the method 400 may include determining, by the mutator thread, that a weak pointer is associated with a flag indicating that the weak pointer was assigned during a sweep phase, the determination occurring during performance of the weak pointer conversion operation during a sweep phase of the garbage collection system. At block 404, the method may include determining that an object referred to by the weak pointer is a live object based on the determination that the weak pointer is associated with the flag. At block 406, the method may include enumerating, by the garbage collection thread, the weak pointer during the marking phase of the garbage collection system and at block 408, the method may include removing, by the garbage collection thread, from the weak pointer, the association with the flag indicating that the weak pointer was assigned during a sweep phase.

Figure 5:
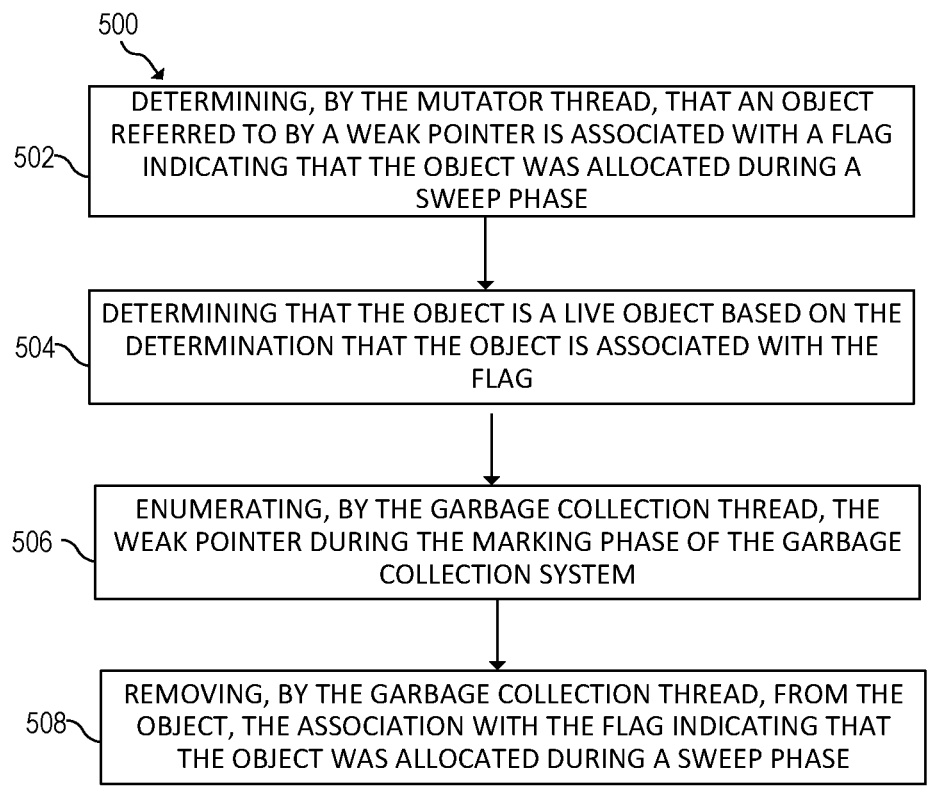
FIG. 5 is a flowchart of another example method for indicating that a weak pointer was assigned during a sweep phase.

Turning now to FIG. 5, a flowchart of an example method 500 for indicating that a weak pointer was assigned during a sweep phase is described. Method 500 may be described below as being executed or performed by a system, for example, system 100 of FIG. 1 or system 800 of FIG. 8. Other suitable systems and/or computing devices may be used as well. Method 500 may be implemented in the form of executable instructions stored on at least one machine-readable storage medium of the system and executed by at least one processor of the system. Alternatively or in addition, method 500 may be implemented in the form of electronic circuitry (e.g., hardware). In alternate examples of the present disclosure, at least one step of method 500 may be executed substantially concurrently or in a different order than shown in FIG. 5. In alternate examples of the present disclosure, method 500 may include more or fewer steps than are shown in FIG. 5. In some examples, at least one of the steps of method 500 may, at certain times, be ongoing and/or may repeat.

At block 504, the method may include determining, by the mutator thread, that an object referred to by a weak pointer is associated with a flag indicating that the object was allocated during a sweep phase, the determination occurring during performance of the weak pointer conversion operation during a sweep phase of the garbage collection system. At block 506 the method may include determining that the object is a live object based on the determination that the object is associated with the flag. At block 508, the method may include enumerating, by the garbage collection thread, the weak pointer during the marking phase of the garbage collection system and, at block 510, removing, by the garbage collection thread, from the object, the association with the flag indicating that the object was allocated during a sweep phase.

Figure 6:
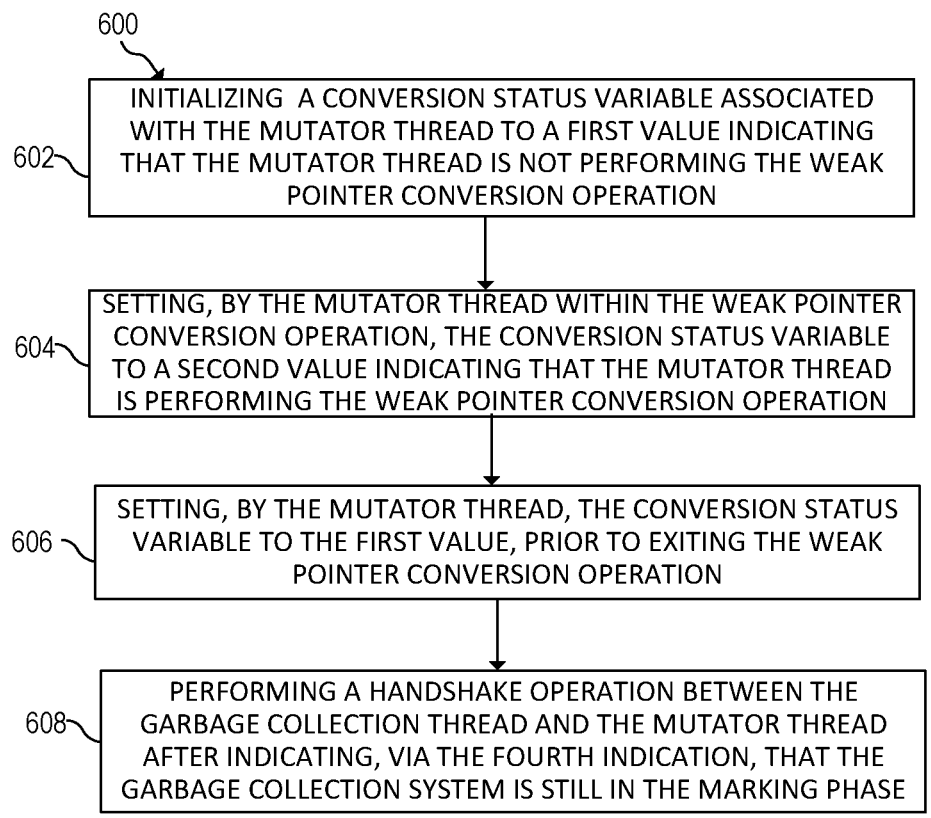
FIG. 6 is a flowchart of an example method for performing a handshake operation between a GC thread and a mutator thread.

Turning now to FIG. 6, a flowchart of an example method 600 for performing a handshake operation between a GC thread and a mutator thread is described. Method 600 may be described below as being executed or performed by a system, for example, system 100 of FIG. 1 or system 800 of FIG. 8. Other suitable systems and/or computing devices may be used as well. Method 600 may be implemented in the form of executable instructions stored on at least one machine-readable storage medium of the system and executed by at least one processor of the system. Alternatively or in addition, method 600 may be implemented in the form of electronic circuitry (e.g., hardware). In alternate examples of the present disclosure, at least one step of method 600 may be executed substantially concurrently or in a different order than shown in FIG. 6. In alternate examples of the present disclosure, method 600 may include more or fewer steps than are shown in FIG. 6. In some examples, at least one of the steps of method 600 may, at certain times, be ongoing and/or may repeat.

At block 602, the method may include initializing a conversion status variable associated with the mutator thread to a first value indicating that the mutator thread is not performing the weak pointer conversion operation. At block 604, the method may include setting, by the mutator thread within the weak pointer conversion operation, the conversion status variable to a second value indicating that the mutator thread is performing the weak pointer conversion operation. At block 606, the method may include setting, by the mutator thread, the conversion status variable to the first value, prior to exiting the weak pointer conversion operation. At block 608, the method may include performing a handshake operation between the garbage collection thread and the mutator thread after indicating, via the fourth indication,that the garbage collection system is still in the marking phase.

The handshake operation may comprise attempting, by the garbage collection thread, to atomically change the conversion status variable from the second value to a third value. When the attempt to atomically change the conversion status variable from the second value to the third value is unsuccessful, the handshake operation may include determining that the mutator thread is not performing the weak pointer conversion operation and that the handshake is complete with respect to the mutator thread. When the attempt to atomically change the conversion status variable from the second value to the third value is successful, the handshake operation may include waiting, by the garbage collection thread until the flag is observed to have a value other than the third value.

Figure 7:
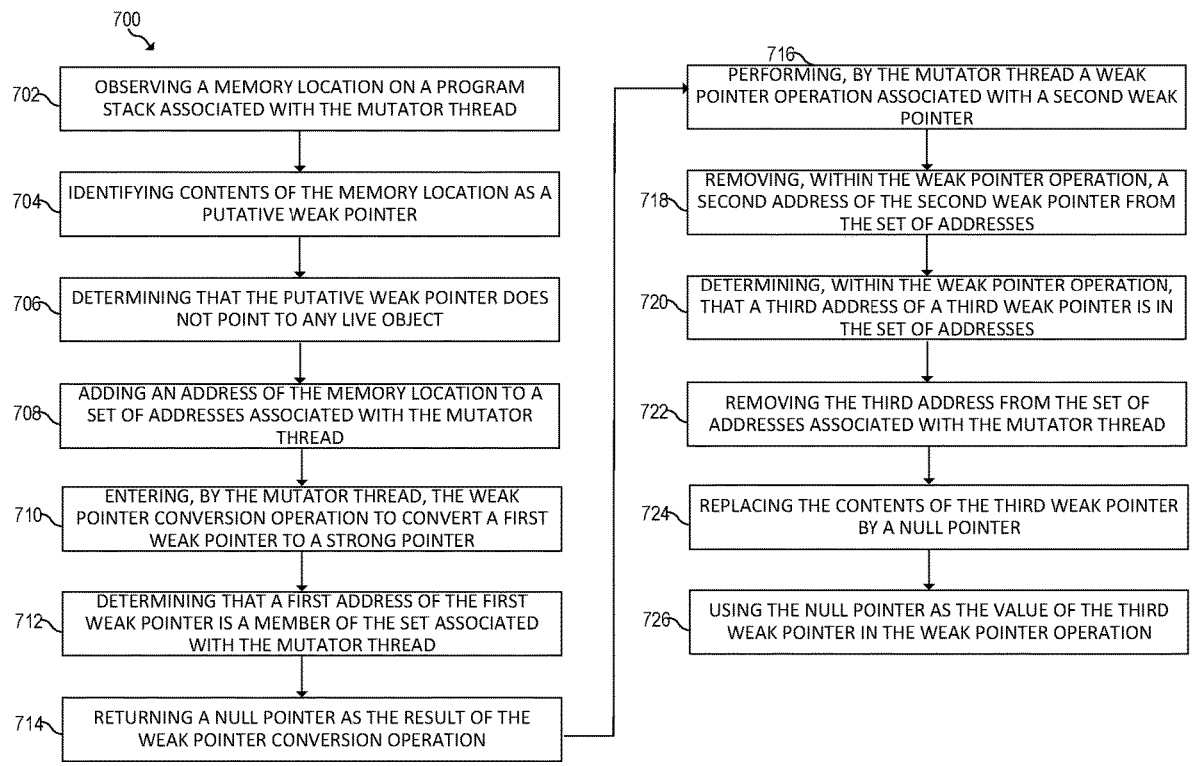
FIG. 7 is a block diagram of an example method for handling weak pointers.

Turning now to FIG. 7, a flowchart of an example method 700 for handling weak pointers is described. Method 700 may be described below as being executed or performed by a system, for example, system 100 of FIG. 1 or system 800 of FIG. 8. Other suitable systems and/or computing devices may be used as well. Method 700 may be implemented in the form of executable instructions stored on at least one machine-readable storage medium of the system and executed by at least one processor of the system. Alternatively or in addition, method 600 may be implemented in the form of electronic circuitry (e.g., hardware). In alternate examples of the present disclosure, at least one step of method 700 may be executed substantially concurrently or in a different order than shown in FIG. 7. In alternate examples of the present disclosure, method 700 may include more or fewer steps than are shown in FIG. 7. In some examples, at least one of the steps of method 700 may, at certain times, be ongoing and/or may repeat.

At block 702, the method may include observing a memory location on a program stack associated with the mutator thread and at block 704, the method may include identifying contents of the memory location as a putative weak pointer. At block 706, the method may include determining that the putative weak pointer does not point to any live object. At block 708, the method may include adding an address of the memory location to a set of addresses associated with the mutator thread. The set of addresses may be similar to the cleared root weak pointer set discussed above in reference to FIG. 1.

At block 710, the method may include entering, by the mutator thread, the weak pointer conversion operation to convert a first weak pointer to a strong pointer and at block 712, the method may include determining that a first address of the first weak pointer is a member of the set associated with the mutator thread. At block 714, the may include returning a null pointer as the result of the weak pointer conversion operation. At block 716, the method may include performing, by the mutator thread a weak pointer operation associated with a second weak pointer. At block 718, the method may include removing, within the weak pointer operation, a second address of the second weak pointer from the set of addresses associated with the mutator thread. At block 720, the method may include determining, within the weak pointer operation, that a third address of a third weak pointer associated with the weak pointer operation is in the set of addresses associated with the mutator thread. At block 722, the method may include removing the third address from the set of addresses associated with the mutator thread. At block 724, the method may include replacing the contents of the third weak pointer by a null pointer and at block 726, the method may include using the null pointer as the value of the third weak pointer in the weak pointer operation.

Figure 8:
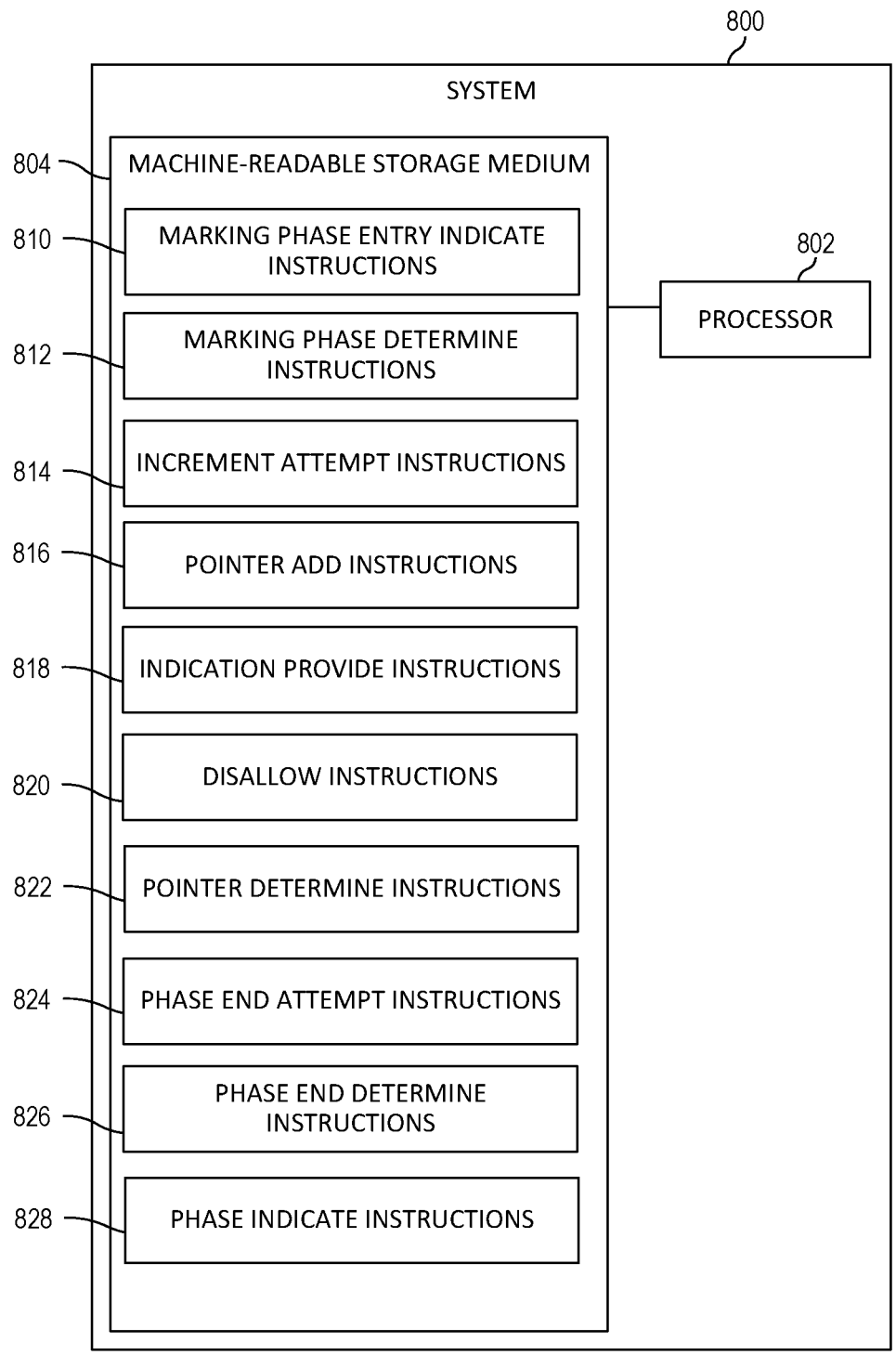
FIG. 8 is a block diagram of an example system for using pointers in a memory managed system.

FIG. 8 is a block diagram of an example system 800 for using pointers in a memory managed system. System 800 may be similar to system 100 of FIG. 1, for example. In the example illustrated in FIG. 8, system 800 includes a processor 802 and a machine-readable storage medium 804. Although the following descriptions refer to a single processor and a single machine-readable storage medium, the descriptions may also apply to a system with multiple processors and multiple machine-readable storage media. In such examples, the instructions may be distributed (e.g., stored) across multiple machine-readable storage media and the instructions may be distributed across (e.g., executed by) multiple processors.

Processor 802 may be one or more central processing units (CPUs), graphics processing units (GPUs), microprocessors, and/or other hardware devices suitable for retrieval and execution of instructions stored in machine-readable storage medium 804. In the example illustrated in FIG. 8, processor 802 may fetch, decode, and execute instructions 810, 812, 814, 818, 820, 822, 824, 826 and 828 for using pointers in a memory managed system. As an alternative or in addition to retrieving and executing instructions, processor 802 may include one or more electronic circuits comprising a number of electronic components for performing the functionality of at least one of the instructions in machine-readable storage medium 804. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 804 may be any electronic, magnetic, optical, or other physical storage device that stores executable instructions. Thus, machine-readable storage medium 804 may be, for example, Random Access Memory (RAM), an Electrically-Erasable Programmable Read-Only Memory (EEPROM), a memristor memory device, a spin-transfer torque device, a flash memory device, a storage drive, a solid state device (SSD), an optical disc, and the like. Machine-readable storage medium 804 may be disposed within system 800, as shown in FIG. 8. In this situation, the executable instructions may be "installed" on the system 800. Alternatively, machine-readable storage medium 804 may be a portable, external or remote storage medium, for example, that allows system 800 to download the instructions from the portable/external/remote storage medium. In this situation, the executable instructions may be part of an "installation package". As described herein, machine-readable storage medium 604 may be encoded with executable instructions for using pointers in a memory managed system.

Referring to FIG. 8, marking phase entry indicate instructions 810, when executed by a processor (e.g., 802), may cause system 800 to indicate, by a garbage collection thread participating in a garbage collection system, via a first indication, that the garbage collection system has entered a marking phase, the garbage collection system managing a heap of memory. Marking phase determine instructions 812, when executed by a processor (e.g., 802), may cause system 800 to determine, by a mutator thread in a set of mutator threads associated with the garbage collection thread, that the garbage collection system in the marking phase based on observing the first indication during a weak pointer conversion operation. Increment attempt instructions 814, when executed by a processor (e.g., 802), attempt, by the mutator thread, to increment a thread count associated with the garbage collection thread, wherein attempting to increment the thread count comprises determining that incrementing has not been disallowed by the garbage collection thread. Pointer add instructions 816, when executed by a processor (e.g., 802), may cause system 800 to, upon successfully incrementing the thread count, by the mutator thread, add, by the mutator thread, a pointer to the set of pointers and decrement the thread count.

Indication provide instructions 818, when executed by a processor (e.g., 802), may cause system 800 to upon unsuccessfully incrementing the thread count, by the mutator thread, provide a second indication indicating that the indicating mutator thread intends to add a pointer to a set of pointers. Disallow instructions 820, when executed by a processor (e.g., 802), may cause system 800 to disallow, by the garbage collection thread, incrementing of the thread count, wherein disallowing incrementing of the thread count comprises determining that the thread count has a zero value. Pointer determine instructions 822, when executed by a processor (e.g., 802), may cause system 800 to determine, by the garbage collection thread, that the set of pointers is empty.

Phase end attempt instructions 824, when executed by a processor (e.g., 802), may cause system 800 to attempt, by the garbage collection thread, to indicate, via a third indication, that the marking phase has ended, wherein indicating using the third indication comprises determining that no mutator threads belonging to the set of mutator threads has provided the second indication. Phase end determine instructions 824, when executed by a processor (e.g., 802), may cause system 800 to determine, by the garbage collection thread, that the marking phase has ended when the attempt to indicate is successful. Phase indicate instructions 826, when executed by a processor (e.g., 802), may cause system 800 to indicate, by the garbage collection thread, via a fourth indication, that the garbage collection system is still in the marking phase when the attempt to indicate is unsuccessful The foregoing disclosure describes a number of examples for using pointers in a memory managed system. The disclosed examples may include systems, devices, computer-readable storage media, and methods for using pointers in a memory managed system. For purposes of explanation, certain examples are described with reference to the components illustrated in FIGS. 1-8. The functionality of the illustrated components may overlap, however, and may be present in a fewer or greater number of elements and components. Further, all or part of the functionality of illustrated elements may co-exist or be distributed among several geographically dispersed locations. Further, the disclosed examples may be implemented in various environments and are not limited to the illustrated examples.

Further, the sequence of operations described in connection with FIGS. 1-8 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method comprising:
indicating, by a garbage collection thread participating in a garbage collection system, via a first indication, that the garbage collection system has entered a marking phase, the garbage collection system managing a heap of memory;
attempting, by the garbage collection thread, to modify a conversion status variable, associated with a mutator thread belonging to a set of mutator threads associated with the garbage collection system, from a first conversion status value, indicating that the mutator thread is performing a weak pointer conversion operation, to a second conversion status value indicating that a handshake is required between the garbage collection thread and the mutator thread;
determining, by the garbage collection thread, that the conversion status variable does not contain the second conversion status value;
determining, by the garbage collection thread, that a set of pointers is empty;
attempting, by the garbage collection thread, to indicate, via a third indication, that the marking phase has ended, wherein indicating using the third indication comprises determining that no mutator thread belonging to the set of mutator threads has provided a second indication indicating that the indicating mutator thread intends to add a pointer to the set of pointers;
determining, by the garbage collection thread, that the marking phase has ended when the attempt is successful; and
indicating, by the garbage collection thread, via a fourth indication, that the garbage collection system is still in the marking phase when the attempt is unsuccessful.

2. The method of claim 1, wherein
attempting to modify the conversion status variable occurs prior to a first phase barrier in a two-phase marking barrier; and
determining that the conversion status variable does not contain the second conversion status value takes place after the first phase barrier in the two-phase marking barrier.

3. The method of claim 1, wherein
indicating via the first indication comprises setting a status variable shared between the garbage collection thread and the mutator thread to a first value indicating that the garbage collection thread is processing the set of pointers;
indicating via the second indication comprises atomically changing the status variable from the first value to a second value indicating that values are being added to the set of pointers;
indicating via the third indication comprises atomically changing the status variable from the first value to a third value indicating that the garbage collection thread is finished processing the set of pointers; and
indicating via the fourth indication comprises atomically changing the status variable from the second value to the first value.

4. The method of claim 3, wherein
indicating via the fourth indication comprises setting a redo requested flag visible to garbage collection threads participating in the garbage collection system to a value indicating that the fourth indication has been indicated; and
attempting to indicate via the third indication comprises determining that the redo requested flag does not indicate that any garbage collection thread has provided the fourth indication.

5. The method of claim 1, further comprising:
observing a memory location on a program stack associated with the mutator thread;
identifying the contents of the memory location as a putative weak pointer;
determining that the putative weak pointer does not point to any live object; and
adding an address of the memory location to a set associated with the mutator thread.

6. The method of claim 1, further comprising:
enumerating a weak pointer during a marking phase; and removing a sweep assigned indication from the weak pointer.

7. The method of claim 1, further comprising:
enumerating a weak pointer during a marking phase; and
removing a sweep allocated indication from an object pointed to by the weak pointer.

8. A non-transitory machine-readable storage medium encoded with instructions, the instructions executable by a processor of a system to cause the system to:
indicate, by a garbage collection thread participating in a garbage collection system, via a first indication, that the garbage collection system has entered a marking phase, the garbage collection system managing a heap of memory;
determine, by a mutator thread in a set of mutator threads associated with the garbage collection thread, that the garbage collection system is in the marking phase based on observing the first indication during a weak pointer conversion operation;
attempt, by the mutator thread, to increment a thread count associated with the garbage collection thread, wherein attempting to increment the thread count comprises determining that incrementing has not been disallowed by the garbage collection thread;
upon successfully incrementing the thread count, by the mutator thread, add, by the mutator thread, a pointer to the set of pointers and decrement the thread count;
upon unsuccessfully incrementing the thread count, by the mutator thread, provide a second indication indicating that the indicating mutator thread intends to add a pointer to a set of pointers;
disallow, by the garbage collection thread, incrementing of the thread count, wherein disallowing incrementing of the thread count comprises determining that the thread count has a zero value;
determine, by the garbage collection thread, that the set of pointers is empty;
attempt, by the garbage collection thread, to indicate, via a third indication, that the marking phase has ended, wherein indicating using the third indication comprises determining that no mutator threads belonging to the set of mutator threads has provided the second indication;
determine, by the garbage collection thread, that the marking phase has ended when the attempt to indicate is successful; and
indicate, by the garbage collection thread, via a fourth indication, that the garbage collection system is still in the marking phase when the attempt to indicate is unsuccessful.

9. The non-transitory machine-readable storage medium of claim 8, wherein the instructions executable by the processor of the system further cause the system to:
determine, by the mutator thread, that a weak pointer is associated with a flag indicating that the weak pointer was assigned during a sweep phase, the determination occurring during performance of the weak pointer conversion operation during a sweep phase of the garbage collection system;
determine that an object referred to by the weak pointer is a live object based on the determination that the weak pointer is associated with the flag;
enumerate, by the garbage collection thread, the weak pointer during the marking phase of the garbage collection system; and
remove, by the garbage collection thread, from the weak pointer, the association with the flag indicating that the weak pointer was assigned during a sweep phase.

10. The non-transitory machine-readable storage medium of claim 8, wherein the instructions executable by the processor of the system cause the system to:
determine, by the mutator thread, that an object referred to by a weak pointer is associated with a flag indicating that the object was allocated during a sweep phase, the determination occurring during performance of the weak pointer conversion operation during a sweep phase of the garbage collection system;
determine that the object is a live object based on the determination that the object is associated with the flag;
enumerate, by the garbage collection thread, the weak pointer during the marking phase of the garbage collection system; and
remove, by the garbage collection thread, from the object, the association with the flag indicating that the object was allocated during a sweep phase.

11. The non-transitory machine-readable storage medium of claim 8, wherein the instructions executable by the processor of the system further cause the system to:
initialize a conversion status variable associated with the mutator thread to a first value indicating that the mutator thread is not performing the weak pointer conversion operation;
set, by the mutator thread within the weak pointer conversion operation, the conversion status variable to a second value indicating that the mutator thread is performing the weak pointer conversion operation;
set, by the mutator thread, the conversion status variable to the first value, prior to exiting the weak pointer conversion operation; and
perform a handshake operation between the garbage collection thread and the mutator thread after indicating, via the fourth indication, that the garbage collection system is still in the marking phase, the handshake comprising:
attempting, by the garbage collection thread, to atomically change the conversion status variable from the second value to a third value,
when the attempt to atomically change the conversion status variable from the second value to the third value is unsuccessful, determining that the mutator thread is not performing the weak pointer conversion operation and that the handshake is complete with respect to the mutator thread; and
when the attempt to atomically change the conversion status variable from the second value to the third value is successful, waiting, by the garbage collection thread until the flag is observed to have a value other than the third value.

12. The non-transitory machine-readable storage medium of claim 8, wherein the instructions executable by the processor of the system further cause the system to:
observe a memory location on a program stack associated with the mutator thread;
identify contents of the memory location as a putative weak pointer;
determine that the putative weak pointer does not point to any live object; and
add an address of the memory location to a set of addresses associated with the mutator thread.

13. The non-transitory machine-readable storage medium of claim 12, wherein the instructions executable by the processor of the system further cause the system to:

enter, by the mutator thread, the weak pointer conversion operation to convert a first weak pointer to a strong pointer;

determine that a first address of the first weak pointer is a member of the set associated with the mutator thread; and return a null pointer as the result of the weak pointer conversion operation.

14. The non-transitory machine-readable storage medium of claim 12, wherein the instructions executable by the processor of the system further cause the system to:

perform, by the mutator thread a weak pointer operation associated with a second weak pointer;

remove, within the weak pointer operation, a second address of the second weak pointer from the set of addresses associated with the mutator thread;

determine, within the weak pointer operation, that a third address of a third weak pointer associated with the weak pointer operation is in the set of addresses associated with the mutator thread;

remove the third address from the set of addresses associated with the mutator thread;

replace the contents of the third weak pointer by a null pointer; and use the null pointer as the value of the third weak pointer in the weak pointer operation.

15. A system comprising:

an entry indicator to indicate, via a first indication, that a garbage collection system comprising a plurality of garbage collection threads has entered a marking phase, the garbage collection system managing a heap of memory;

an indication receiver to receive a second indication from a mutator thread belonging to a set of mutator threads associated with the garbage collection system, the second indication indicating that the mutator thread intends to add a pointer to a set of pointers;

a pointer determiner to determine that the set of pointers is empty;

an ending indicator to attempt to indicate, via a third indication, that the marking phase has ended, wherein indicating using the third indication comprises determining that no mutator threads belonging to the set of mutator threads has provided the second indication and that no garbage collection thread belonging to the plurality of garbage collection threads has provided a fourth indication;

an ending handler to determine that the marking phase has ended when the attempt is successful; and a marking phase indicator to indicate, via the fourth indication, that the garbage collection system is still in the marking phase.

16. The system of claim 15, wherein the entry indicator to indicate, via the first indication, comprises the entry indicator to set a status variable shared between the garbage collection thread and the mutator thread to a first value indicating that the garbage collection thread is processing the set of pointers;

the ending indicator to indicate, via the third indication, comprises the ending indicator to atomically change the status variable from the first value to a third value indicating that the garbage collection thread is finished processing the set of pointers; and the marking phase indicator to indicate, via the fourth indication, comprises the marking phase indicator to atomically change the status variable from the second value to the first value.

17. The system of claim 16, wherein the marking phase indicator to indicate, via the fourth indication, comprises the marking phase indicator to set a redo requested flag visible to garbage collection threads participating in the garbage collection system to a value indicating that the fourth indication has been indicated; and the ending indicator to indicate, via the third indication, comprises the ending indicator to determine that the redo requested flag does not indicate that any garbage collection thread has indicated via the fourth indication.

18. The system of claim 16, further comprising:

a mutator thread handler to:

observe a memory location on a program stack associated with the mutator thread;

identify contents of the memory location as a putative weak pointer;

determine that the putative weak pointer does not point to any live object; and add an address of the memory location to a set associated with the mutator thread.

19. The system of claim 16, further comprising:

a weak pointer handler to:

enumerate a weak pointer during a marking phase; and remove a sweep assigned indication from the weak pointer.

20. The system of claim 16, further comprising:

a weak pointer handler to:

enumerate a weak pointer during a marking phase; and remove a sweep allocated indication from an object pointed to by the weak pointer.

* * * * *